(12) United States Patent
Garcia

(10) Patent No.: US 10,153,719 B2
(45) Date of Patent: Dec. 11, 2018

(54) METHOD AND CONTROL ARRANGEMENT FOR CONTROLLING A REACTIVE POWER SOURCE

(71) Applicant: VESTAS WIND SYSTEMS A/S, Aarhus N (DK)

(72) Inventor: Jorge Martinez Garcia, Risskov (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 117 days.

(21) Appl. No.: 14/958,522

(22) Filed: Dec. 3, 2015

(65) Prior Publication Data
US 2016/0084229 A1 Mar. 24, 2016

Related U.S. Application Data

(63) Continuation of application No. 13/578,107, filed as application No. PCT/EP2011/052678 on Feb. 23, 2011, now Pat. No. 9,236,742.
(Continued)

(30) Foreign Application Priority Data

Feb. 25, 2010 (DK) .................................. 2010 70069

(51) Int. Cl.
*F03D 9/00* (2016.01)
*H02P 9/00* (2006.01)
(Continued)

(52) U.S. Cl.
CPC .............. *H02P 9/007* (2013.01); *F03D 9/003* (2013.01); *F03D 9/255* (2017.02); *H02J 3/1857* (2013.01);
(Continued)

(58) Field of Classification Search
CPC ........ H02J 3/1857; F03D 9/003; F03D 9/255; H02P 9/007; H02P 9/14; Y02E 10/763
(Continued)

(56) References Cited

U.S. PATENT DOCUMENTS 6,856,038 B2 2/2005 Rebsdorf
7,245,037 B2 * 7/2007 Angquist .............. H02J 3/1835
290/44

(Continued)

FOREIGN PATENT DOCUMENTS

EP 1508951 A1 2/2005
WO 2009092834 A1 7/2009
WO 2009083446 A2 12/2009

OTHER PUBLICATIONS

Denmark Patent and Trademark Office, Denmark Application No. PA 2010 70069 Office Action dated Oct. 7, 2010, 5 pages.
(Continued)

*Primary Examiner* — Viet Nguyen
(74) *Attorney, Agent, or Firm* — Patterson + Sheridan, LLP

(57) ABSTRACT

The present invention relates to a method for controlling a reactive power source in a wind power plant, the method comprising the steps of providing a wind turbine reactive power control signal and providing an active power reference signal, said active power reference signal being a measure of an active power production of the wind power plant. A control signal for the reactive power source is generated by combining the wind turbine reactive power control signal and the active power reference signal in such a way that the control signal for the reactive power source becomes a weighted signal of the wind turbine reactive power control signal. Moreover, the present invention
(Continued)

relates to control units and wind power plants suitable for carrying out the present invention.

20 Claims, 4 Drawing Sheets

Related U.S. Application Data

(60) Provisional application No. 61/308,132, filed on Feb. 25, 2010.

(51) Int. Cl.
*H02P 9/14* (2006.01)
*H02J 3/18* (2006.01)
*F03D 9/25* (2016.01)
*H02J 3/38* (2006.01)

(52) U.S. Cl.
CPC ............ *H02P 9/14* (2013.01); *F05B 2270/32* (2013.01); *H02J 3/386* (2013.01); *Y02E 10/763* (2013.01); *Y02E 40/26* (2013.01)

(58) Field of Classification Search
USPC ...................................... 290/44, 55
See application file for complete search history.

(56) References Cited

U.S. PATENT DOCUMENTS

| | | | |
|---|---|---|---|
| 7,353,083 B2 | 4/2008 | Hennessy | |
| 7,531,911 B2 | 5/2009 | Rivas et al. | |
| 7,944,184 B2* | 5/2011 | Choy | H02J 3/18 290/44 |
| 8,008,793 B2 | 8/2011 | Andresen et al. | |
| 8,041,465 B2 | 10/2011 | Larsen et al. | |
| 8,044,527 B2 | 10/2011 | Mari et al. | |
| 8,198,742 B2 | 6/2012 | Jorgensen et al. | |
| 8,234,015 B2 | 7/2012 | Bech et al. | |
| RE43,698 E | 10/2012 | Hudson | |
| 9,236,742 B2* | 1/2016 | Garcia | H02J 3/1857 |
| 2003/0015876 A1* | 1/2003 | Ichinose | F03D 9/005 290/44 |
| 2007/0097565 A1* | 5/2007 | Oohara | H02J 3/24 361/20 |
| 2007/0135970 A1 | 6/2007 | Zhou et al. | |
| 2008/0150283 A1* | 6/2008 | Rivas | H02J 3/1885 290/44 |
| 2009/0021013 A1* | 1/2009 | Andresen | F03D 7/0272 290/44 |
| 2009/0194995 A1 | 8/2009 | Delmerico et al. | |
| 2009/0206606 A1* | 8/2009 | Jorgensen | F03D 7/0224 290/44 |
| 2009/0218820 A1 | 9/2009 | Gertmar et al. | |
| 2010/0002475 A1 | 1/2010 | Folts et al. | |
| 2010/0025994 A1 | 2/2010 | Cardinal et al. | |
| 2010/0109328 A1* | 5/2010 | Li | F03D 9/003 290/44 |
| 2010/0259229 A1 | 10/2010 | Gale et al. | |
| 2011/0109085 A1 | 5/2011 | Nelson | |
| 2011/0148114 A1* | 6/2011 | Garcia | H02J 3/386 290/44 |
| 2011/0156389 A1* | 6/2011 | Arlaban Gabeiras | F03D 9/005 290/44 |
| 2012/0101640 A1 | 4/2012 | Stapelfeldt | |
| 2013/0076037 A1 | 3/2013 | Garcia | |
| 2013/0116841 A1 | 5/2013 | Garcia | |

OTHER PUBLICATIONS

European Patent Office, International Application No. PCT/EP2011/052678 International Search Report dated Sep. 26, 2011, 3 pages.

* cited by examiner

METHOD AND CONTROL ARRANGEMENT FOR CONTROLLING A REACTIVE POWER SOURCE

This application is a continuation of co-pending U.S. patent application Ser. No. 13/578,107, filed Aug. 9, 2012, which is a national stage filing of International Application No. PCT/EP2011/052678, filed Feb. 23, 2011, which claims priority to U.S. provisional application Ser. No. 61/308,132, filed Feb. 25, 2010, and Denmark application Serial No. PA 2010 70069, filed Feb. 25, 2010. The aforementioned related patent applications are herein incorporated by reference in their entirety.

FIELD OF THE DISCLOSURE

The present invention relates to a method and a control arrangement for controlling a reactive power source in a wind power plant facility. In particular, the present invention relates to a method and a control arrangement for controlling a reactive power source at different active power levels.

BACKGROUND

With increasing penetration of wind power generation, the requirements for the connection of wind power plants (WPPs) to the electrical grid are defined by new and emerging grid connection codes. The grid connection requirements vary in different parts of the world, but they share common aims, like to permit the development, maintenance, and operation of a coordinated, reliable, and economical transmission or distribution system.

The new requirements generally demand that WPPs provide ancillary services to support the network in which they are connected. WPPs differ from other generation sources— therefore they are particular in certain aspects of their control.

The main differences with synchronous generators (SGs) are as follows:

the energy source fluctuates and is unpredictable,

WPPs are highly modular and composed by a large number of generation units, thus introducing communication delays when sending the operational set points, and these could be in the range of hundredths of milliseconds, the SGs provide the reactive power feed directly to the transmission system through their unit transformer which provides a more efficient voltage regulation since the reactive power is not transported over a long distance and through several transformers, and wind turbine generators (WTGs) have bigger limitations in their reactive power and current capability due to the size of their electronic power converters.

Therefore, replacing traditional power plants, including their control characteristics during periods of strong wind could be a concern. Grid operators are solving this challenge by means of redacting specific sections in the grid codes for WPP performance.

Normally, the requirements of the utilities can be solved by the wind turbines and the plant controller. The wind power plant control can take place at wind turbine level and/or at plant level. The WPP controller can range from simply passing on references to the wind turbine control systems to performing the majority of closed-loop controls itself.

As voltage control is actuated by reactive power from the wind turbines it is possible to affirm that the voltage control design will cover an inner reactive power/voltage control loop, located at turbine level combined with an outer voltage control loop located at the point of common coupling (PCC) where it is intended to control the voltage.

However, at high active power levels it may occur that wind turbines, in particular doubly-fed induction generators, are not able to provide sufficient reactive power for voltage control. In such situation additional reactive power sources may be activated in order to ensure that a wind power plant meets the grid code requirement.

It may be seen as an object of embodiments of the present invention to provide a method and a control arrangement for controlling a reactive power source, in particular, at high active power levels.

SUMMARY

The above-mentioned object is complied with by providing, in a first aspect, a method for controlling a reactive power source in a wind power plant, the method comprising the steps of:

providing a wind turbine reactive power control signal for a wind turbine of the wind power plant, providing an active power reference signal, said active power reference signal being a measure of an active power production of the wind power plant, and generating a control signal for the reactive power source by combining the wind turbine reactive power control signal and the active power reference signal.

The term reactive power source may be a capacitive or an inductive energy source, or alternative a combination thereof. Thus, the reactive power source may for example be a static synchronous compensator (STATCOM) suitable for injecting reactive power into a power supply grid in order to fulfil a required grid voltage support.

Also, the term wind power plant should be understood broadly thus covering both full scale wind turbine facilities and doubly-fed induction generator (DFIG) configurations. However, the above-mentioned method is of particular relevance for DFIG configurations.

Wind turbine reactive power control signals may be generated for each wind turbine within the wind power plant.

The active power reference signal may also be a measure for a wind speed at the site of the wind power plant.

The wind turbine reactive power control signal, denoted $V_{ref}$ in FIG. 4, and the active power reference signal, denoted K in FIG. 4, may be combined in such a way that the control signal for the reactive power source, denoted $V_{ref\_STATCOM}$ in FIG. 4, is a weighted signal of the wind turbine reactive power control signal. It should be noted that the control signal for the reactive power source may be applicable for other reactive power sources than a STATCOM.

It is advantageous that the control signal for the reactive power source is linked to the wind turbine reactive power control signal. The weighting factors may depend on the amount of active power produced, or other signals relative to the active power production, such as wind speed, and the weighting factors may be defined in a look-up table embedded into a chip.

The active power reference signal may increase monotonically with the active power production of the wind power plant as illustrated in table 2. In particular, the active power reference signal may vary between zero and unity depending on the active power production of the wind power plant. As an example, the active power reference signal may equal zero when no active power is produced and it may equal one at nominal active power production.

Preferably, the control signal for the reactive power source, denoted $V_{ref\_STATCOM}$, is generated by multiplication of the wind turbine reactive power control signal, denoted $V_{ref}$, and the active power reference signal, denoted K—cf. FIG. 4. In this way the control signal for the reactive power source may vary between zero and the actual value of the wind turbine reactive power control signal.

A more detailed description of FIG. 4 will follow below.

In a second aspect, the present invention relates to a wind power plant comprising a central control unit, said central control unit comprising a control dispatcher adapted to provide control signals to at least one reactive power source in accordance with the method according to the first aspect of the present invention.

In a third aspect, the present invention relates to a control dispatcher for a wind power plant, said control dispatcher being adapted to at least partly control at least one reactive power source and at least one wind turbine in the wind power plant, the control dispatcher comprising, means for receiving a wind turbine reactive power control signal for a wind turbine of the wind power plant, means for generating an active power reference signal from a measure of an active power production of the wind power plant, and means for generating a control signal for the reactive power source by combining the wind turbine reactive power control signal and the active power reference signal.

Again, the term reactive power source may be a capacitive or an inductive energy source, or alternative a combination thereof. Thus, the reactive power source may for example be a STATCOM suitable for injecting reactive power into a power supply grid in order to fulfil a required grid voltage support. Also, the term wind power plant should be understood broadly thus covering both full scale wind turbine facilities and DFIG configurations. However, the above-mentioned control dispatcher is of particular relevance for DFIG configurations.

Similar to the first aspect of the present invention, the active power reference signal may also be a measure for a wind speed at the site of the wind power plant.

The control dispatcher may form an integral part of the WPP controller and its functionally is primarily to split the reference calculated by the WPP controller into the different power generating units constituting the WPP, such units typically being wind turbines and reactive power source.

Again referring to FIG. 4, the wind turbine reactive power control signal is denoted $V_{ref}$, the active power reference signal is denoted K, and the control signal for the reactive power source is denoted $V_{ref\_STATCOM}$. It should be noted that the control signal for the reactive power source may be applicable for other reactive power sources than a STATCOM.

The means for generating an active power reference signal may comprise a low-pass filter for low-pass filtering the measure of the active power production of the wind power plant. Moreover, the means for generating the control signal for the reactive power source may comprise means for multiplication of the wind turbine reactive power control signal and the active power reference signal.

It is advantageous that the control signal for the reactive power source becomes linked by weighting to the wind turbine reactive power control signal by such multiplication. The weighting factors may depend on the amount of active power produced, and the weighting factors may be defines in a look-up table embedded into a chip.

The control dispatcher may be configured to pass through the received wind turbine reactive power control signal essentially without modifying said received wind turbine reactive power control signal.

In a fourth aspect, the present invention relates to a wind power plant comprising a central control unit, said central control unit comprising a control dispatcher in accordance with the third aspect of the present invention.

BRIEF DESCRIPTION OF THE DRAWINGS

The present invention will now be explained in further details with reference to the accompanying drawings, wherein.

Figure 1:
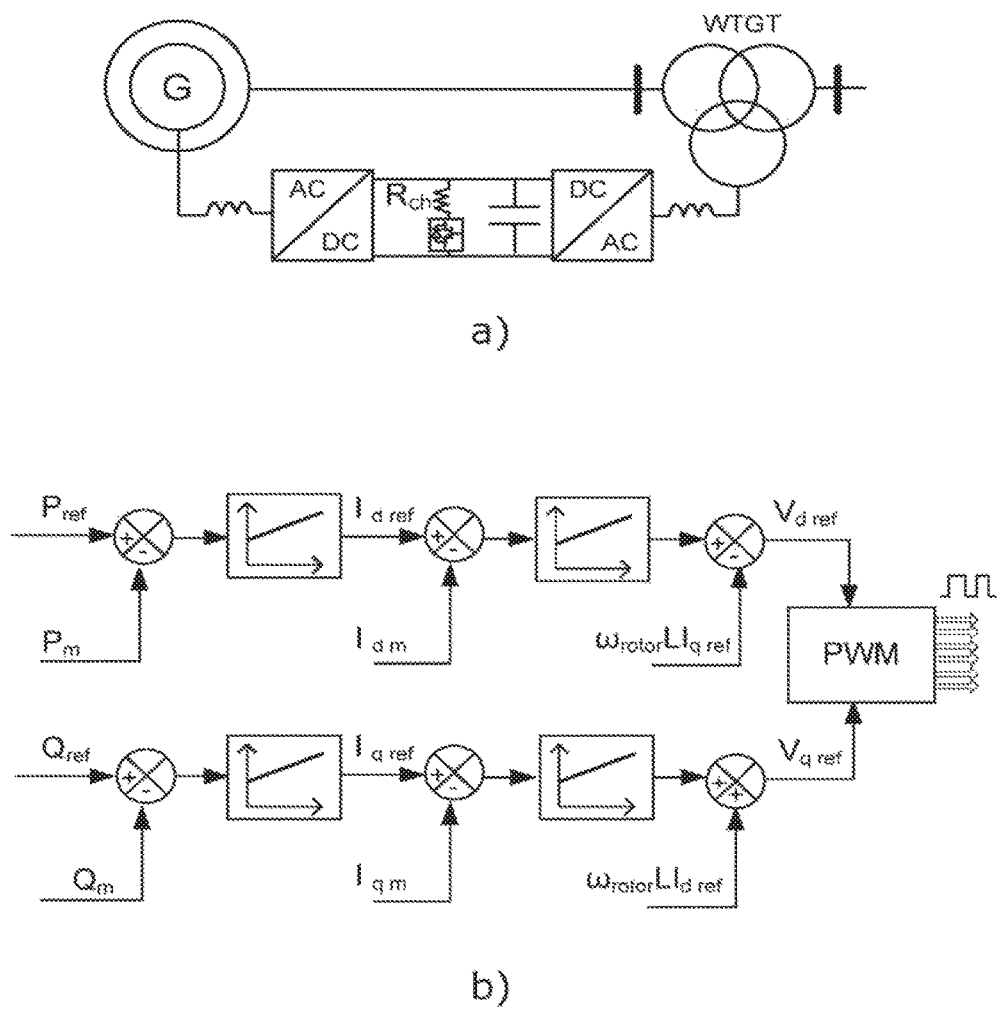
FIG. 1 shows a) a simplified doubly-fed diagram, and b) a simplified doubly-fed controller diagram.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

In principle the present invention relates to various types of wind turbine configurations including full scale wind turbine facility and in particular DFIG configurations. Since the present invention is of particular relevance for DFIG configurations the invention will, in the following, be described with reference to such configurations.

The variable speed doubly-fed generator, cf. FIG. 1a, allows full control of generator active and reactive power using the rotor-connected frequency converter. Its rating is typically in the order of 0.3 pu. Operating both with sub- and super-synchronous speed, the power can be fed both in and out of the rotor circuit. The rotor-connected converter can employ various power dissipation solutions during severe transients. These solutions may involve an active crowbar, which is located at the rotor terminals, or a chopper in the DC link, $R_{ch}$—cf. FIG. 1a. The grid converter is used to regulate the voltage level of the DC link.

A simplified control diagram of the DFIG controller is depicted in FIG. 1b where the active power, P, and reactive power, Q, are controlled using the d and q axis, respectively. The DFIG controller calculates or receives power references, $P_{ref}$, $Q_{ref}$ from an external controller. These power references are processed using two PI-controllers in cascade; and they will generate the needed voltage references, $V_{d\ ref}$, $V_{q\ ref}$, which are translated by the PWM to pulse the rotor converter. Finally, the rotor is fed with a voltage that produces the desired P and Q at the stator terminals.

Figure 2:
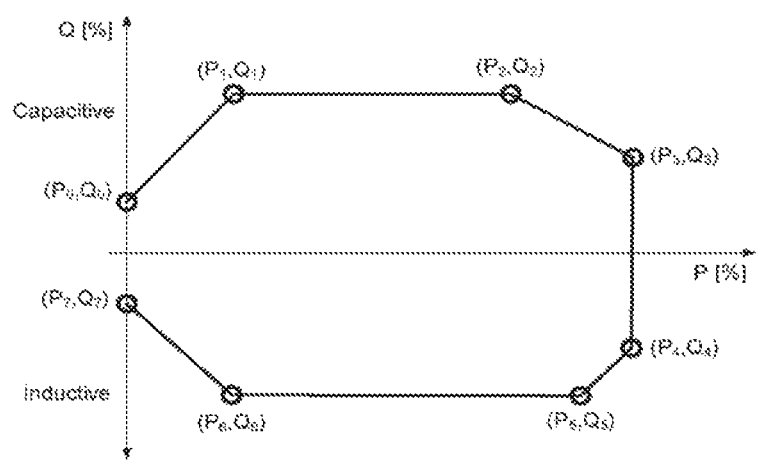
FIG. 2 shows a P-Q doubly-fed chart.

FIG. 2 shows a P-Q chart obtained from the stator terminals of a DFIG machine. The asymmetry with respect to the Q injection is due to the excitation of the generator. All P-Q combinations inside the plotted area can be injected. Clearly, the maximum Q injection is dependent on the current P value, thus $Q_{max}=f(P)$. The ratio Q/P gets its maximum value around 10% active power injection.

The P-Q DFIG chart coordinates are listed in Table 1:

TABLE 1

| Point | P | Q | Unit in WPP base |
|---|---|---|---|
| 0 | 0 | 10 | [%] |
| 1 | 10 | 60 | [%] |
| 2 | 70 | 60 | [%] |
| 3 | 100 | 20 | [%] |
| 4 | 100 | 30 | [%] |
| 5 | 85 | 60 | [%] |
| 6 | 10 | 60 | [%] |
| 7 | 0 | 15 | [%] |

Thus, from FIG. 2 and Table 1 it is clear that the nature of a DFIG configuration sets an upper limit to the available reactive power in the high active power regime. For example, going from working point ($P_2$, $Q_2$) to working point ($P_3$, $Q_3$) the amount of reactive power, Q, needs to be reduced from 60% to 20% of nominal power in order to increase the active power, P, from 70% to 100% of nominal power.

In wind power plant reactive power support can be provided by power generating unit other than wind turbines. Thus, it may be advantageous to activate such other reactive power generating unit when the wind turbines of the wind power plant are operated at or near their nominal power levels. A reactive power generating unit can be a STATCOM.

The STATCOM based on a voltage source converter is one of the most used devices for reactive power support. STATCOMs are found increasing utilization in power systems because of their ability to provide improved performance compared with conventional thyristor-based converters. The primary purpose of a STATCOM is to support busbar voltage by providing appropriate capacitive and inductive reactive power into the system. It is also capable of improving the transient- and steady-state stability of a power system. Therefore, STATCOM systems have been initially used for improving flexibility and reliability of power transmission systems.

Figure 3:
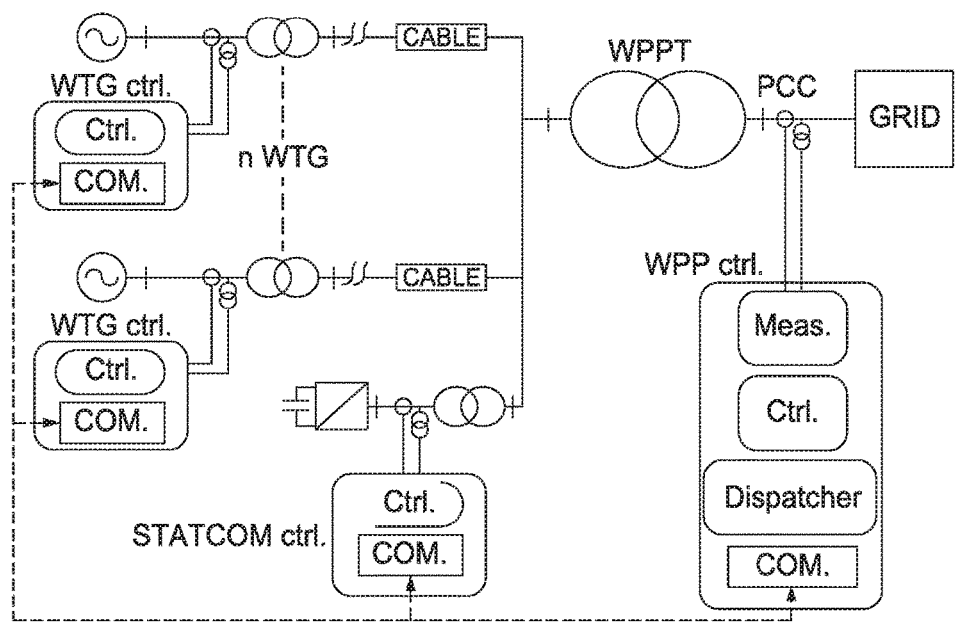
FIG. 3 shows a wind power plant diagram.

Referring now to FIG. 3 a WPP controller is required to control the characteristics of the power injected at the PCC. Therefore, a centralized plant controller (WPP ctrl.) is needed to supervise the power injected at PCC. The plant controller receives the references and feedback (measurements) and outputs the turbine set-points. The plant controller is formed by a measurement device, which senses the currents and voltages at the PCC, a dedicated computer which allocates the control algorithms, and a communication hub. The communication hub will exchange control references and other signals with a large amount of WTGs (WTG ctrl.) and other devices located in the substation.

Still referring to FIG. 3 the dispatcher of the WPP controller has the functionality of splitting the reference calculated by the WPP controller into the different power generating units constituting the WPP. The way of splitting the reference can be done following several strategies, e.g. minimization of lost energy production. The strategy suggested in view of the present invention is based on using the STATCOM as a reactive power back-up for the system in case the reactive power injected by the WTGs is not sufficient for grid code fulfillment.

Figure 4:
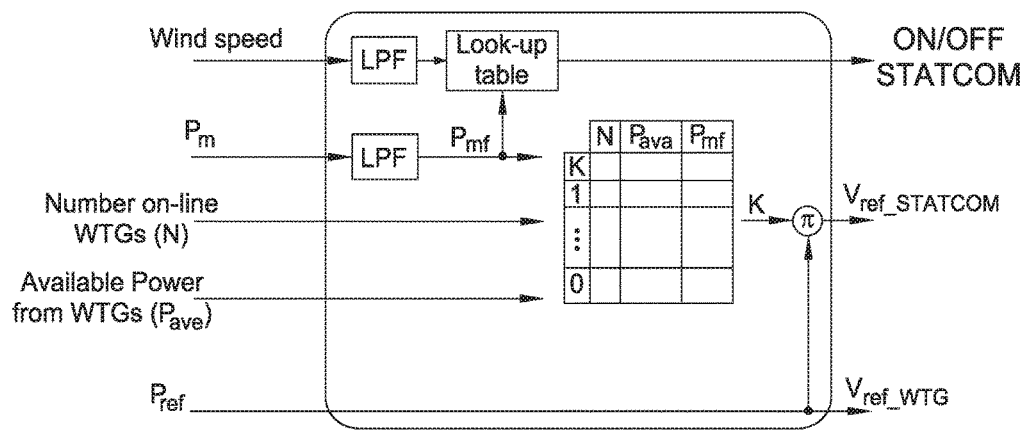
FIG. 4 shows a control dispatcher diagram.

In FIG. 4 the dispatcher block is illustrated in a schematic way. The active power, $P_m$, measured at PCC is filtered with a low-pass filter and used for calculating a K-factor with a look-up table. $P_m$ can be replaced accordingly with the wind speed. The K-factor varies between 0 and 1, and multiplies with the reference $V_{ref}$ which is calculated by the WPP controller thereby obtaining the reference for the STATCOM, $V_{ref\_STATCOM}$.

As depicted in FIG. 4 the number of WTGs on-line, N, is a control parameter as well. The value of K thus depends on the number on-line WTGs within the WPP. Alternatively or in combination therewith, it is possible to use the amount of available power from the on-line WTGS, $P_{ava}$, as a control parameter. The available amount of power from the WPP is the sum of the available power from the individual WTGs and it is given by:

$$P_{ava} = P_{rated} - P_{actual}$$

Moreover, the wind speed signal and the active power production can be used to set the disconnection of the external reactive power compensation device in order to avoid electrical losses, e.g. if the production of active power and the wind speed have been below some range during a certain amount of time a disconnection command/signal will be sent to the reactive power compensation unit. When the wind speed and production level conditions are re-established a connection command/signal will be send to the reactive power compensation unit.

As shown in FIG. 4 the reference for the WTGs, $V_{ref\_WTG}$, is the same as the one calculated by the WPP controller, $V_{ref}$.

The dispatcher look-up table can be implemented as shown in table 2.

TABLE 2

| P | K | Unit in WPP base |
|---|---|---|
| 0 | 0.0 | [%] |
| 10 | 0.1 | [%] |
| 20 | 0.2 | [%] |
| 30 | 0.3 | [%] |
| 40 | 0.4 | [%] |
| 50 | 0.5 | [%] |
| 60 | 0.6 | [%] |
| 70 | 0.7 | [%] |
| 80 | 0.8 | [%] |
| 90 | 0.9 | [%] |
| 100 | 1.0 | [%] |

Thus, by following the control strategy suggested by the present invention reactive power support to a power supply grid, from for example a STATCOM, can be provided as a weighted value of WTG references.

What is claimed is:

1. A method for controlling power output of a wind power plant (WPP) comprising one or more wind turbines (WTs) and a non-WT reactive power source, the method comprising:
   calculating an active power control signal for a first WT of the one or more WTs, wherein the active power control signal indicates increasing an active power production of the first WT from a current active power production level;
   determining that increasing the active power production of the first WT from the current active production level requires decreasing a reactive power production of the first WT from a current reactive power production level;
   generating a reactive power control signal for the first WT corresponding to decreasing the reactive power production of the first WT; and activating the non-WT reactive power source in conjunction with decreasing the reactive power production of the first WT responsive to determining that decreasing the reactive power production of the first WT is required, wherein activating the non-WT reactive power source comprises generating a control signal for the non-WT reactive power source using (i) the reactive power control signal and (ii) an active power reference signal representing an amount of active power production of the WPP.

2. The method of claim 1, wherein the non-WT reactive power source comprises a capacitive reactive power source.

3. The method of claim 2, wherein the non-WT reactive power source comprises a static compensator (STATCOM).

4. The method of claim 1, wherein the non-WT reactive power source comprises an inductive reactive power source.

5. The method of claim 1, wherein the reactive power control signal comprises a voltage reference for the first WT, wherein generating the reactive power control signal is performed responsive to determining that the first WT is unable to produce, at an increased active power production level specified by the active power control signal, sufficient reactive power to meet the voltage reference.

6. The method of claim 1, wherein the active power reference signal comprises a factor K that is determined using a measurement of the active power production of the WPP.

7. The method of claim 6, wherein the reactive power control signal for the first WT comprises a voltage reference $V_{ref}$, wherein the control signal for the non-WT reactive power source is generated using a multiplicative product ($K \times V_{ref}$).

8. The method of claim 6, wherein a value of the control signal for the non-WT reactive power source is controlled within a range between zero and a value of the reactive power control signal for the first WT.

9. The method of claim 1, wherein the active power reference signal is a measure for a wind speed at a site of the WPP.

10. A control arrangement for a wind power plant (WPP) comprising one or more wind turbines (WTs) and a non-WT reactive power source, the WPP having an amount of active power production, the control arrangement comprising:
   a controller comprising a processor configured to:
      calculate an active power control signal for a first WT of the one or more WTs, wherein the active power control signal indicates increasing an active power production of the first WT from a current active power production level;
      determine that increasing the active power production of the first WT from the current active power production level requires decreasing a reactive power production of the first WT from a current reactive power production level;
      generate a reactive power control signal for the first WT corresponding to decreasing the reactive power production of the first WT; and
      activating the non-WT reactive power source in conjunction with decreasing the reactive power production of the first WT responsive to determining that decreasing the reactive power production of the first WT is required, wherein activating the non-WT reactive power source comprises generating a control signal for the non-WT reactive power source using (i) the reactive power control signal and (ii) an active power reference signal representing the amount of active power production of the WPP.

11. The control arrangement of claim 10, wherein the reactive power source comprises a capacitive reactive power source.

12. The control arrangement of claim 11, wherein the reactive power source comprises a static compensator (STATCOM).

13. The control arrangement of claim 10, wherein the reactive power source comprises an inductive reactive power source.

14. The control arrangement of claim 10, wherein the reactive power control signal comprises a voltage reference for the first WT, wherein generating the reactive power control signal is performed responsive to determining that the first WT is unable to produce, at an increased active power production level specified by the active power control signal, sufficient reactive power to meet the voltage reference.

15. A wind power plant comprising the control arrangement of claim 10.

16. The control arrangement of claim 10, wherein the active power reference signal is a measure for a wind speed at a site of the WPP.

17. A computer program product comprising a computer-readable device having computer-readable program code embodied therewith, the computer-readable program code configured to perform an operation for controlling power output of a wind power plant (WPP) comprising one or more wind turbines (WTs) and a non-WT reactive power source, the operation comprising:
   calculating an active power control signal for a first WT of the one or more WTs, wherein the active power control signal indicates increasing an active power production of the first WT from a current active power production level;
   determining that increasing the active power production of the first WT from the current active production level requires decreasing a reactive power production of the first WT from a current reactive power production level;
   generating a reactive power control signal for the first WT corresponding to decreasing the reactive power production of the first WT; and
   activating the non-WT reactive power source in conjunction with decreasing the reactive power production of the first WT responsive to determining that decreasing the reactive power production of the first WT is required, wherein activating the non-WT reactive power source comprises generating a control signal for the non-WT reactive power source using (i) the reactive power control signal and (ii) an active power reference signal representing an amount of active power production of the WPP.

18. The computer program product of claim 17, wherein the reactive power control signal comprises a voltage reference for the first WT, wherein generating the control signal for the reactive power source is performed responsive to determining that the first wind turbine is unable to produce, at an increased active power production level specified by the active power control signal, sufficient reactive power to meet the voltage reference.

19. The computer program product of claim 17, the operation further comprising:
   generating the active power reference signal by filtering a measurement of the amount of active production of the wind power plant.

20. The computer program product of claim 17, wherein the active power reference signal is a measure for a wind speed at a site of the WPP.

* * * * *